No. 812,197.  PATENTED FEB. 13, 1906.
H. R. FULLER.
METHOD OF INSTRUCTION.
APPLICATION FILED JULY 10, 1905.

WITNESSES
INVENTOR
Harvey R Fuller

UNITED STATES PATENT OFFICE.

HARVEY RUSSELL FULLER, OF KIRKSVILLE, MISSOURI.

METHOD OF INSTRUCTION.

No. 812,197.  Specification of Letters Patent.  Patented Feb. 13, 1906.

Application filed July 10, 1905. Serial No. 269,119.

*To all whom it may concern:*

Be it known that I, HARVEY RUSSELL FULLER, a citizen of the United States, residing at Kirksville, in the county of Adair and State of Missouri, have invented a certain new and useful Method of Instruction, of which the following is a specification.

The primary object of my invention is to provide a simple, concise, and time-saving method of giving and receiving instruction, a substitute for oral, written, or sign language methods.

Another object of my invention is to construct a plan suitable to give and receive instructions by an unfortunate class of our people known as "mutes" or "dumb persons" without the use of the ordinary means of instructing them and in less time than it would be possible with either oral, sign, or written-word methods.

A still further object of my invention is to devise means suited to be used in conjunction with ordinary text books in public and private schools, so as to simplify instruction.

The use of my method of instruction may be greatly facilitated by the formation of schools for the purpose of giving instructions through the mail. It may be used by schools of this class now in existence known as "correspondence-schools."

The invention in its preferred form is hereinafter more specifically described with reference to the accompanying drawing, forming a part of this specification, in which the figure presents a face view of my novel method of instruction and is designed to be placed in the hands of a correspondence-school.

It consists of a lesson-space, a taskmaster, and assignment-lines, all of which are used in the assignment of task to be performed. There is also a student's work-space, a critic, correction and approval lines, all of which are used in the examination of work performed, it being fully understood that the plan herein presented in detail is given merely to illustrate the principles of my method and is subject to changes to suit study under consideration.

We will suppose that a person desires to pursue a course of study at school provided with my method of instruction. The instructor places within the copy or lesson-space the task to be performed by drawing assignment-lines to the work within the lesson-space, connecting it with the words under the heading of "Taskmaster" to express the amount or extent of task to be performed. He delivers it to pupil. The pupil performs the assigned task and presents in student's work-space samples of work performed. Then in turn the instructor draws correction or approval lines from the words under the heading "Critic" to express mistakes or approval and returns the work to student, and assigns lesson No. 2, all of which it would be possible for the instructor to do without writing a word.

In the use of my method in instructing a class of mutes the plan or the form herein given would have to be greatly enlarged in classwork. It would have to be as large as an ordinary individual blackboard when crayons are used. The instructor would draw lines to assign or examine work after the work was placed in lesson-space.

In the use of my method, in conjunction with text-books, in some cases it would be best to only place the page or number of lesson in the lesson-space. The mode of examination would be the same as heretofore fully explained.

The invention in its preferred form is more fully described, with reference by letter.

A represents the preferred heading for instruction-blank.

B represents the taskmaster. Its office is to assist in the assignment of task to be performed.

C represents the critic. Its function is to criticise or approve of work of pupil, a line connecting work in work-space to words of such import in critic-column to express a correction or an approval, a short stroke at the right of a word to show a general approval.

D represents the lesson-space and is adjacent to the taskmaster and is adapted to receive work to be considered in lesson or the number of lessons.

E represents the student's work-space. Should be adjacent to the critic. In some cases it will be best to have an erasable or removable surface.

F represents the position-cut space. In certain lines of work it is helpful to show the correct position.

G represents the column of numerals. Is useful in expressing the quantity in the assignment of work or stating the grade of work executed.

What I claim as new, and desire to secure by Letters Patent, is—

1. The herein-described method of instruction, constituting a substitute for oral written or sign methods comprising a critic a work-space adjacent to the said "critic" and adapted to be connected thereto by correction or approval lines as and for purposes fully set forth.

2. The herein-described system of instruction constituting a substitute for oral, written or sign methods of instruction comprising a lesson-space a "taskmaster" adjacent thereto and adapted to be joined to the said taskmaster by assignment-lines, and also comprising a work-space a "critic" adjacent thereto adapted to be joined to work in said work-space by correction or approval lines as and for purposes fully set forth.

HARVEY RUSSELL FULLER.

Witnesses:
 CLARENCE W. FEASTER,
 ISAAC A. LEHMAN.